(12) United States Patent
Nakano et al.

(10) Patent No.: US 8,186,213 B2
(45) Date of Patent: May 29, 2012

(54) THERMAL-TYPE FLOWMETER

(75) Inventors: Hiroshi Nakano, Hitachi (JP);
Masahiro Matsumoto, Hitachi (JP);
Keiji Hanzawa, Mito (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 312 days.

(21) Appl. No.: 12/708,387

(22) Filed: Feb. 18, 2010

(65) Prior Publication Data
US 2010/0242591 A1    Sep. 30, 2010

(30) Foreign Application Priority Data
Mar. 24, 2009 (JP) ................................. 2009-071127

(51) Int. Cl.
*G01F 1/68* (2006.01)
(52) U.S. Cl. ................................. 73/204.26
(58) Field of Classification Search ............... None
See application file for complete search history.

(56) References Cited

U.S. PATENT DOCUMENTS

| | | | |
|---|---|---|---|
| 4,895,616 A | 1/1990 | Higashi et al. | |
| 2002/0007674 A1* | 1/2002 | Leung | 73/488 |
| 2004/0069061 A1* | 4/2004 | Watanabe et al. | 73/204.26 |
| 2004/0244479 A1* | 12/2004 | Matsumoto et al. | 73/204.26 |
| 2006/0144138 A1 | 7/2006 | Yamada et al. | |
| 2008/0229818 A1 | 9/2008 | Nakano et al. | |
| 2008/0282791 A1 | 11/2008 | Nakano et al. | |

FOREIGN PATENT DOCUMENTS

| | | |
|---|---|---|
| EP | 0 452 134 A2 | 10/1991 |
| EP | 1 484 584 A2 | 12/2004 |
| JP | 2006-52944 A | 2/2006 |
| JP | 2008-233012 A | 10/2008 |
| JP | 2008-286604 A | 11/2008 |
| WO | WO 97/49998 A1 | 12/1997 |

OTHER PUBLICATIONS

European Search Report dated Aug. 16, 2010 (eight (8) pages).

* cited by examiner

*Primary Examiner* — Harshad Patel
(74) *Attorney, Agent, or Firm* — Crowell & Moring LLP

(57) ABSTRACT

The present invention provides a highly-sensitive thermal-type flow-rate sensor with enhanced reliability. Provided is a thermal-type flow-rate sensor including: a passage into which a measurement-target fluid is introduced; and a sensor element which is provided in the passage and which measures the flow rate of the measurement-target fluid. The sensor element 1 includes: a semiconductor substrate; a hollow portion formed in the semiconductor substrate; and a heating resistor formed on an electric insulating film above the hollow portion. The sensor element measures the flow rate of the measurement-target fluid by radiating heat from the heating resistor to the measurement-target fluid. When Lh is the length of the heating resistor in a direction perpendicular to a flowing direction of the measurement-target fluid and Wd is the shortest distance to an upstream-side edge of the heating resistor from an edge of the hollow portion (an outer peripheral edge of a diaphragm) in the flowing direction of the measurement-target fluid, $Wd \geq 0.4 \times Lh$ is satisfied in a relation between Lh and Wd.

9 Claims, 10 Drawing Sheets

THERMAL-TYPE FLOWMETER

TECHNICAL FIELD

The present invention relates to a thermal-type flowmeter that has a heating resistor placed in a measurement-target fluid to measure the flow rate of the measurement-target fluid. In particular, the invention relates to a thermal-type flowmeter that is suitable for measuring the amount of intake-air flow and the amount of exhaust gas flow of an internal combustion engine of a vehicle.

BACKGROUND ART

A thermal-type air-flow meter capable of directly measuring the mass flow has been the mainstream of an air-flow meter for detecting the amount of intake-air flow in an internal combustion engine of a vehicle.

In recent years, there has been proposed a technique for manufacturing a sensor element of a thermal-type flowmeter on a semiconductor substrate such as a silicon (Si) substrate by use of the micro-electro-mechanical system (MEMS) technology. To form such a sensor element of semiconductor type, a hollow portion is formed by removing a rectangular-shaped portion of a semiconductor substrate. Then, an electric insulating film having a thickness of several micrometers is formed above the hollow portion, and a heating resistor is formed on the electric insulating film. The heating resistor is as small as a size of several hundreds of micrometers, and is formed to be a thin film. Accordingly, the heating resistor has a small heat capacity, and thus is capable of fast response and low electric-power consumption. In addition, temperature sensors (temperature-measuring resistors) are formed in upstream and downstream vicinities of the heating resistor. The amount of flow is detected by detecting the temperature difference between a point located upstream of the heating resistor and a point located downstream thereof. The temperature-difference method makes it also possible to determine whether the fluid flows in a normal direction or in a reverse direction.

In a case where an air-flow meter such as one described above is installed in the internal combustion engine of a vehicle or the like and is used for a long time under harsh conditions, it is important to secure reliability of the sensor element by preventing contamination. If the thermal-type flowmeter is exposed to the intake-air flow for a long time, buoyant particles such as carbon particles are deposited on the electric insulating film on the surface of the hollow portion of the sensor element due to a thermophoresis effect. The deposition of such particles impairs the measurement accuracy. An example of conventional techniques to address this problem of contamination is disclosed in Patent Literature 1.

According to the technique disclosed in Patent Literature 1, the deposition of the contaminants caused by the thermophoresis phenomenon is reduced in the following way. The heating temperature of a heating resistor on an electric insulating film and the distance from an upstream-side edge of the heating resistor to an upstream-side edge of the electric insulating film located above the hollow portion are determined so that the temperature distribution can change gradually from the upstream-side edge of the heating resistor to the upstream-side edge of the electric insulating film.

[Citation List]
[Patent Literature]
[Patent Literature 1] Japanese Patent Application Publication No. 2006-52944

SUMMARY OF INVENTION

Technical Problems

When a measure is taken against the problem by configurations such as one disclosed in Patent Literature 1, however, it is necessary to set the heating temperature of the heating resistor at a low temperature or to widen the hollow portion to expand the thin-film portion. Here, flowing around the heating resistor, the measurement-target fluid has a temperature difference between the upstream side and the downstream side of the heating resistor. However, setting the heating resistor at a low temperature makes the temperature difference so small that the detection sensitivity for the flow rate will be lowered. In addition, a wider hollow portion expands the area of the thin-film portion, and thus causes a problem of weakening the thin-film portion.

An object of the present invention is to provide a highly-sensitive thermal-type flowmeter in which buoyant particles such as carbon particles are prevented from depositing on a thin-film portion where a heating resistor of a sensor element is formed, even in a case where the thermal-type flowmeter is installed in an internal combustion engine of a vehicle or the like and used for a long time in a harsh contamination environment.

In order to achieve the foregoing object, the thermal-type flowmeter according to the present invention is configured as follows. The thermal-type flowmeter includes: a passage into which a measurement-target fluid is introduced; and a sensor element which is provided in the passage and which measures a flow rate of the measurement-target fluid, the sensor element including a semiconductor substrate; a hollow portion formed in the semiconductor substrate, and a heating resistor formed on an electric insulating film above the hollow portion, the sensor element measuring the flow rate of the measurement-target fluid by radiating heat from the heating resistor to the measurement-target fluid. When Lh is the length of the heating resistor in a direction perpendicular to a flowing direction of the measurement-target fluid and Wd is the shortest distance between an upstream-side edge of the heating resistor and a peripheral edge of the hollow portion in the flowing direction of the measurement-target fluid, $Wd \geq 0.4 \times Lh$ is satisfied in a relation between Lh and Wd. With this configuration, by raising the heating temperature of the heating resistor, the adhering of the buoyant particles such as carbon particles can be reduced. Preferably, $Wd \geq 0.5 \times Lh$ is satisfied in the relation between Lh and Wd.

In addition, when Ld is the shortest distance between an edge of the heating resistor and the peripheral edge of the hollow portion in the direction perpendicular to the flowing direction of the measurement-target fluid, $Ld \geq 0.4 \times Lh$ is preferably satisfied in a relation between Lh and Ld. Preferably, $Ld \geq 0.5 \times Lh$ is satisfied in a relation among Lh and Ld. This configuration leads to a configuration in which the adhering of the buoyant particles such as carbon particles is reduced by raising the heating temperature of the heating resistor.

According to the conventional technique, if the heating temperature of the heating resistor is raised, the thermophoresis effect is accelerated to increase the adhesion amount. With the above-described configuration, however, the adhering of the buoyant particles can be reduced. Accordingly, by raising the heating temperature of the heating resistor, the sensitivity of flow-rate detection by the sensor element can be easily improved. In addition, the heating resistor can be reduced in size, and thus the electric power consumption of the heating resistor can be reduced. Consequently, the sensor element can be driven with smaller electric power.

In addition, Ld≧Wd is preferably satisfied in a relation between Wd and Ld. With this configuration, the adhering of the buoyant particles can be reduced more effectively. The adhering of the buoyant particles to the electric insulating film increases heat conduction from the heating resistor to the semiconductor substrate. However, the adhering of the buoyant particles to the electric insulating film can be reduced. Accordingly, heat conduction from the heating resistor to the semiconductor substrate can be reduced. Consequently, the sensor element can be made to consume less electric power.

Furthermore, the thermal-type flowmeter includes temperature-measuring resistors respectively formed both upstream of and downstream of the heating resistor. The length of each of the temperature-measuring resistors in the direction perpendicular to the flowing direction of the measurement-target fluid is preferably equal to or shorter than the length of the heating resistor in the direction perpendicular to the flowing direction of the measurement-target fluid. With this configuration, in the temperature distribution on the hollow portion (diaphragm), the peak temperature is recorded at the center of the heating resistor. Accordingly, the flow-rate measuring sensitivity can be improved by shortening the length of the upstream-side temperature-measuring resistor, by shortening the length of the downstream-side temperature-measuring resistor, and by concentrating the temperature-measuring resistors in the vicinity of the center of the heating resistor. In addition, this configuration can reduce deterioration of the measurement accuracy, which might otherwise deteriorate by factors such as a change of a buoyant particles adhering portion because of an occurrence of such a drifting flow that the measurement-target fluid flows in an oblique direction.

The hollow portion is formed into a rectangular shape having shorter sides formed to extend in the flowing direction of the measurement-target fluid and having longer sides perpendicular to the shorter sides. The heating resistor is provided to extend in a direction along the longer sides and is folded back at end portions in the extending direction, thereby including a plurality of resistor sections arranged in parallel with each other on the electric insulating film. The length of each of the plurality of resistor sections in the extending direction of the plurality of resistor sections is preferably larger than a total width of the plurality of resistor sections arranged in parallel with each other.

A heating control is preferably performed so that a heating temperature of the heating resistor is at least 200° C. higher than a temperature of the measurement-target fluid. Accordingly, even if oil used in the internal combustion engine of a vehicle or the like is mixed into the intake air, the oil can be evaporated, and thus acceleration of the adhering of the buoyant particles, such adhering of the buoyant particles can be suppressed. In addition, the heating resistor does not always have to be heated up to 200° C. or even higher. It is, however, possible to obtain the same effect with a configuration where the heating resistor is heated up to 200° C. only temporarily in some conditions of the temperature of air and of the time.

Moreover, the thermal-type flowmeter according to an aspect the invention includes: a passage into which a measurement-target fluid is introduced; and a sensor element which is provided in the passage and which measures a flow rate of the measurement-target fluid. The sensor element includes a semiconductor substrate, a hollow portion formed in the semiconductor substrate, a heating resistor formed on an electric insulating film above the hollow portion, and temperature-measuring resistors provided respectively both upstream of and downstream of the heating resistor in a flowing direction of the measurement-target fluid, and formed on the electric insulating film above the hollow portion. The hollow portion is formed into a rectangular shape having shorter sides formed to extend in the flowing direction of the measurement-target fluid and having longer sides perpendicular to the shorter sides. The heating resistor is provided to extend in a direction along the longer sides and is folded back at end portions in the extending direction, thereby including a plurality of resistor sections arranged in parallel with each other on the electric insulating film, and the heating resistor is formed in such a manner that the length of each of the plurality of resistor sections in the extending direction of the plurality of resistor sections is larger than a total width of the plurality of resistor sections arranged in parallel with each other. Each of the temperature-measuring resistors is formed to have a length in a direction perpendicular to the flowing direction of the measurement-target fluid that is equal to or shorter than the length of the heating resistor in the direction perpendicular to the flowing direction of the measurement-target fluid. When Lh is the length of the heating resistor in the direction perpendicular to the flowing direction of the measurement-target fluid, Wd is the shortest distance between an upstream-side edge of the heating resistor and the peripheral edge of the hollow portion in the flowing direction of the measurement-target fluid, and Ld is the shortest distance between an edge of the heating resistor and the peripheral edge of the hollow portion in the direction perpendicular to the flowing direction of the measurement-target fluid, Wd≧0.4×Lh is satisfied in a relation between Lh and Wd, and Ld≧0.4×Lh is preferably satisfied in a relation between Lh and Ld.

Advantageous Effect of Invention

According to the present invention, provided is a highly-sensitive and power saving thermal-type flow-rate sensor with reliability enhanced by preventing adhesion of buoyant particles such as carbon particles due to the thermophoresis effect.

DESCRIPTION OF EMBODIMENTS

Description will be given below with regard to some embodiments of the invention by referring to the accompanying drawings.

[First Embodiment]

Description will be given below with regard to a first embodiment of the invention.

Figure 1:
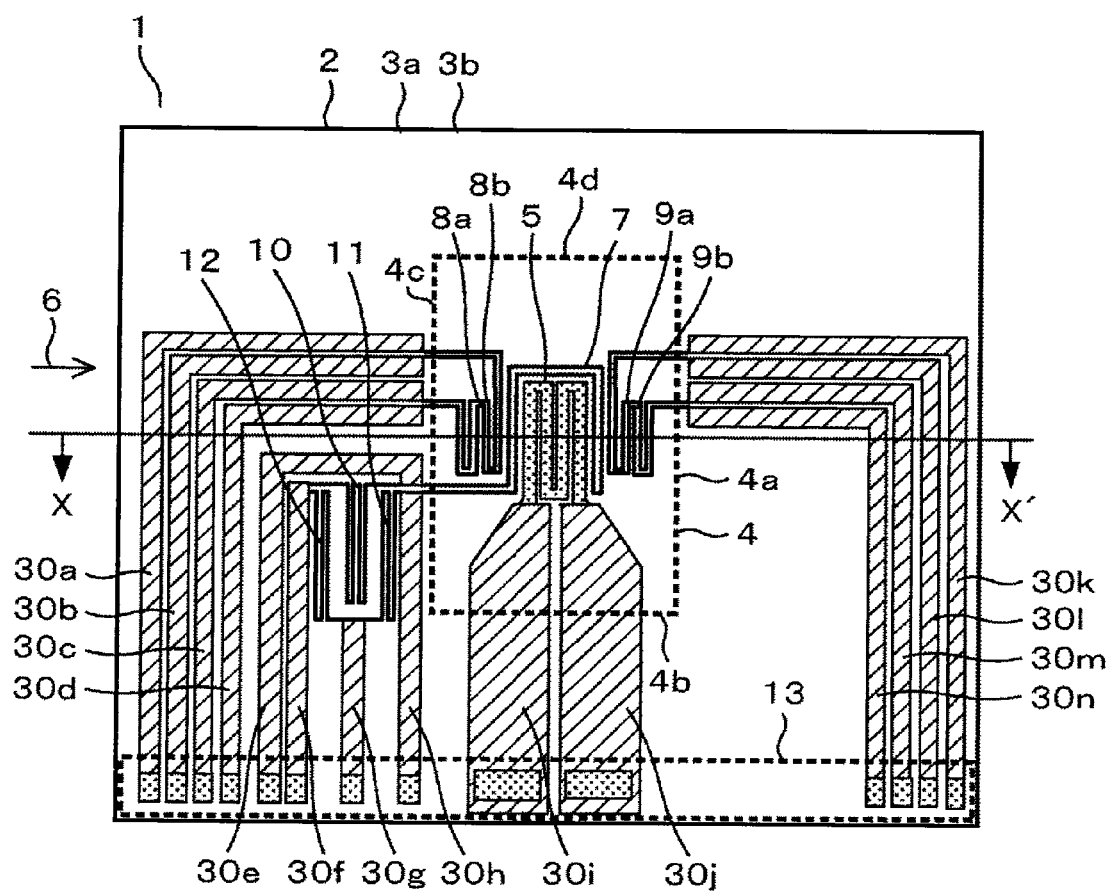
FIG. 1 is a plan view illustrating a sensor element 1 of a thermal-type flow-rate sensor according to a first embodiment of the invention.
Figure 2:
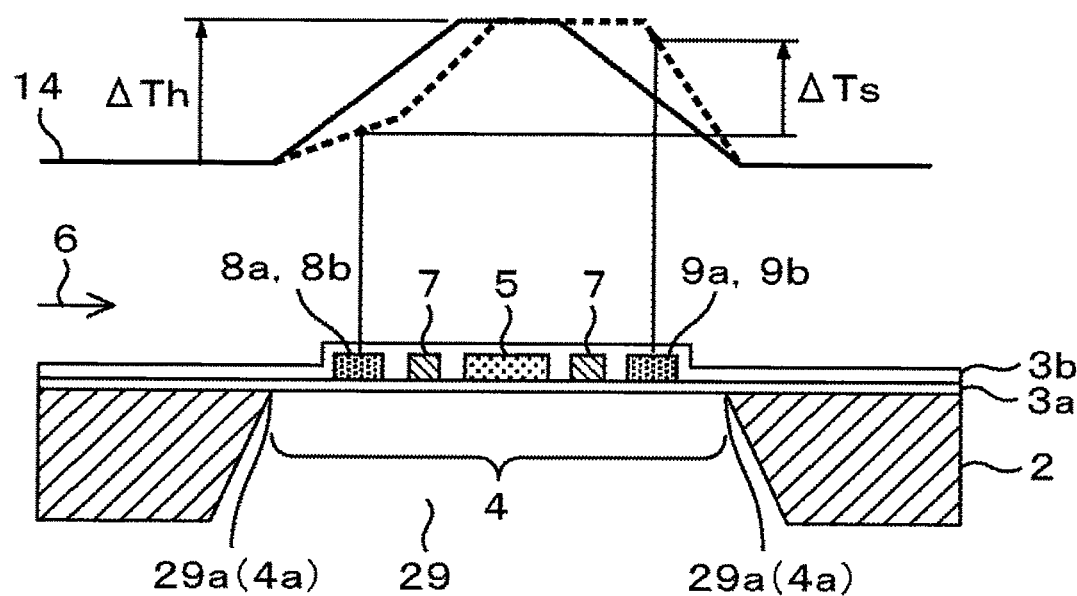
FIG. 2 is a sectional view illustrating a section of the sensor element 1 taken along the line X-X in FIG. 1.

The configuration of a sensor element 1 of a thermal-type flowmeter according to this first embodiment will be described below by referring to FIGS. 1 and 2. FIG. 1 is a plan view illustrating the sensor element 1. FIG. 2 is a sectional view taken along the line X-X' in FIG. 1. A substrate 2 of the sensor element 1 is made of a material having good thermal conductivity, such as silicon and ceramics. An electric insulating film 3a is formed on the substrate 2. The substrate 2 is then etched from the back side to form a hollow portion 29, which is formed into a diaphragm 4.

A heating resistor 5 is formed on a surface of a central portion of the electric insulating film 3a in the diaphragm 4. A heating-temperature sensor 7 to detect the heating temperature of the heating resistor 5 is formed in such a manner as to surround the heating resistor 5. By detecting the temperature with the heating-temperature sensor 7, the temperature of the heating resistor 5 is controlled so as to be a certain degree higher than the temperature of an air flow 6. In addition, upstream-side temperature sensors 8a and 8b and downstream-side temperature sensors 9a and 9b are formed at both sides of the heating-temperature sensor 7. The upstream-side temperature sensors 8a and 8b are located upstream of the heating resistor 5 whereas the downstream-side temperature sensors 9a and 9b are located downstream of the heating resistor 5. An electric insulating film 3b is formed to coat the outermost surface of the sensor element 1. The electric insulating film 3b electrically insulates the sensor element 1 as well as serves as a protection film. Thermo-sensitive resistors 10, 11, and 12 are provided in portions on the electric insulating film 3a outside the diaphragm 4. Each of the thermo-sensitive resistors 10, 11, and 12 changes its resistance in accordance with the temperature changes of the air flow 6.

The heating resistor 5, the heating-temperature sensor 7, the upstream-side temperature sensors 8a and 8b, the downstream-side temperature sensors 9a and 9b, the thermo-sensitive resistors 10, 11, and 12 are made of materials which have relatively large resistance-temperature coefficients and which change their respective resistances in accordance with their respective temperatures. Preferred materials for the purpose are: semiconductor materials such as polycrystalline silicone and monocrystalline silicone that are doped with impurities; and metal materials such as platinum, molybdenum, tungsten, and nickel alloys. Each of the electric insulating films 3a and 3b is made of silicon dioxide ($SiO_2$) and silicon nitride ($Si_3N_4$) and is formed into a thin film having an approximately 2-µm thickness, so as to have structure in which a sufficient heat-insulation effect can be obtained.

As described above, the heating resistor 5, the heating-temperature sensor 7, the upstream-side temperature sensors 8a and 8b, and the downstream-side temperature sensors 9a and 9b are thermo-sensitive resistors like the thermo-sensitive resistors 10, 11, and 12.

In addition, an electrode pad portion 13 is formed in an end portion of the sensor element 1. In the electrode pad portion 13, electrodes are formed for connecting the resistors to a driving-and-detecting circuit, the resisters being the heating resistor 5, the heating-temperature sensor 7, the upstream-side temperature sensors 8a and 8b, the downstream-side temperature sensors 9a and 9b, and the thermo-sensitive resistors 10, 11, and 12. The electrodes are made of such materials as aluminum.

The thermal-type flowmeter according to the first embodiment of the invention operates in the following way.

A temperature distribution 14 shown together with a sectional structure of the sensor element 1 in FIG. 2 is a distribution of the surface temperature of the sensor element 1. The solid line in the temperature distribution 14 represents the temperature distribution for the diaphragm 4 in the absence of air that flows past the diaphragm 4. The heating resistor 5 is heated up to a temperature that is higher than the temperature of the air flow 6 by a certain degree, which is denoted by $\Delta Th$ in FIG. 2. The dashed line in the temperature distribution 14 represents the temperature distribution for the diaphragm 4 in the presence of the air flow 6. The air flow 6, if occurs, cools the upstream side of the heating resistor 5 down to lower the temperature of the upstream side of the heating resistor 5. In contrast, since the air that has flown past the heating resistor 5 and has thus been heated flows past the downstream side of the heating resistor 5, the temperature of the downstream side of the heating resistor 5 is raised up. The temperatures at upstream points of heating resistor 5 are measured by the upstream-side temperature sensors 8a and 8b while the temperatures at downstream points of heating resistor 5 are measured by the downstream-side temperature sensors 9a and 9b. From the temperatures thus obtained, a temperature difference $\Delta Ts$ between the upstream side of the heating resistor 5 and the downstream side thereof is measured, and thereby the amount of fluid that flows past the heating resistor 5 is measured.

Subsequently, the driving-and-detecting circuit of the sensor element 1 will be described below.

Figure 3:
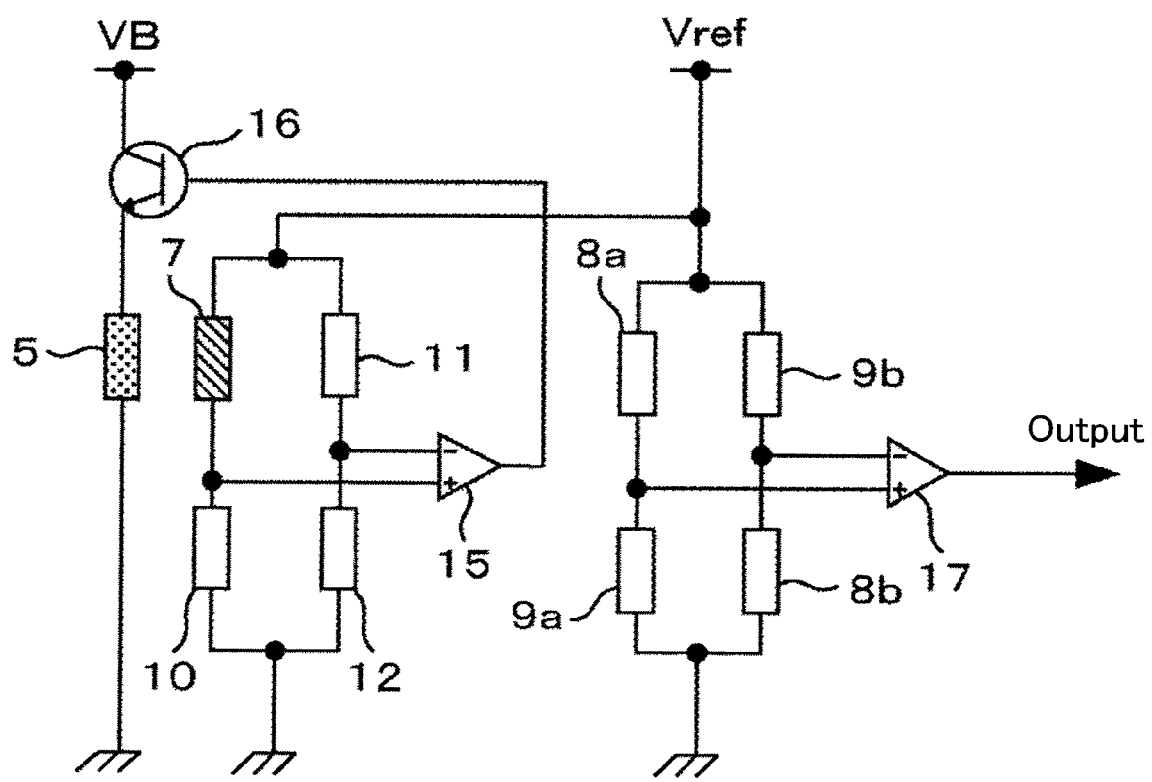
FIG. 3 is a circuit diagram illustrating an electric circuit to drive the sensor element 1 shown in FIG. 1.

FIG. 3 illustrates the driving-and-detecting circuit of the sensor element 1. A bridge circuit is formed with two series circuits that are connected in parallel to each other. One of the two series circuits includes the heating-temperature sensor 7 and the thermo-sensitive resistor 10. The other one includes the thermo-sensitive resistor 11 and thermo-sensitive resistor 12. The resistance of the heating-temperature sensor 7 and the resistances of the thermo-sensitive resistors 10, 11, and 12 change depending upon the changes in temperature of the heating resistor 5. A reference voltage Vref is applied to each of the series circuits. An intermediate voltage of each of the series circuits is extracted and is connected to an amplifier 15. The output of the amplifier 15 is connected to a base of a transistor 16. A collector of the transistor 16 is connected to a power supply VB. An emitter of the transistor 16 is connected to the heating resistor 5. Thus formed is a feedback circuit. With the feedback circuit, a temperature Th of the heating resistor 5 is controlled so that the temperature Th can be kept higher than a temperature Ta of the air flow 6 by a certain degree $\Delta Th(=Th-Ta)$ In addition, another bridge circuit is formed with two series circuits that are connected in parallel to each other. One of the two series circuits includes the upstream-side temperature sensor 8a and the downstream-side temperature sensor 9a. The other one includes the downstream-side temperature sensor 9b and the upstream-side temperature sensor 8b. The reference voltage Vref is applied to each of the series circuits. A difference in temperature between the upstream-side temperature sensors 8a and 8b and the downstream-side temperature sensors 9a and 9b occurs due to the air flow 6, the resistance balance within the bridge circuit changes to produce a differential voltage. On the basis of this differential voltage, an output in accordance with the amount of the air flow 6 is obtained by means of the amplifier 17.

Figure 4:
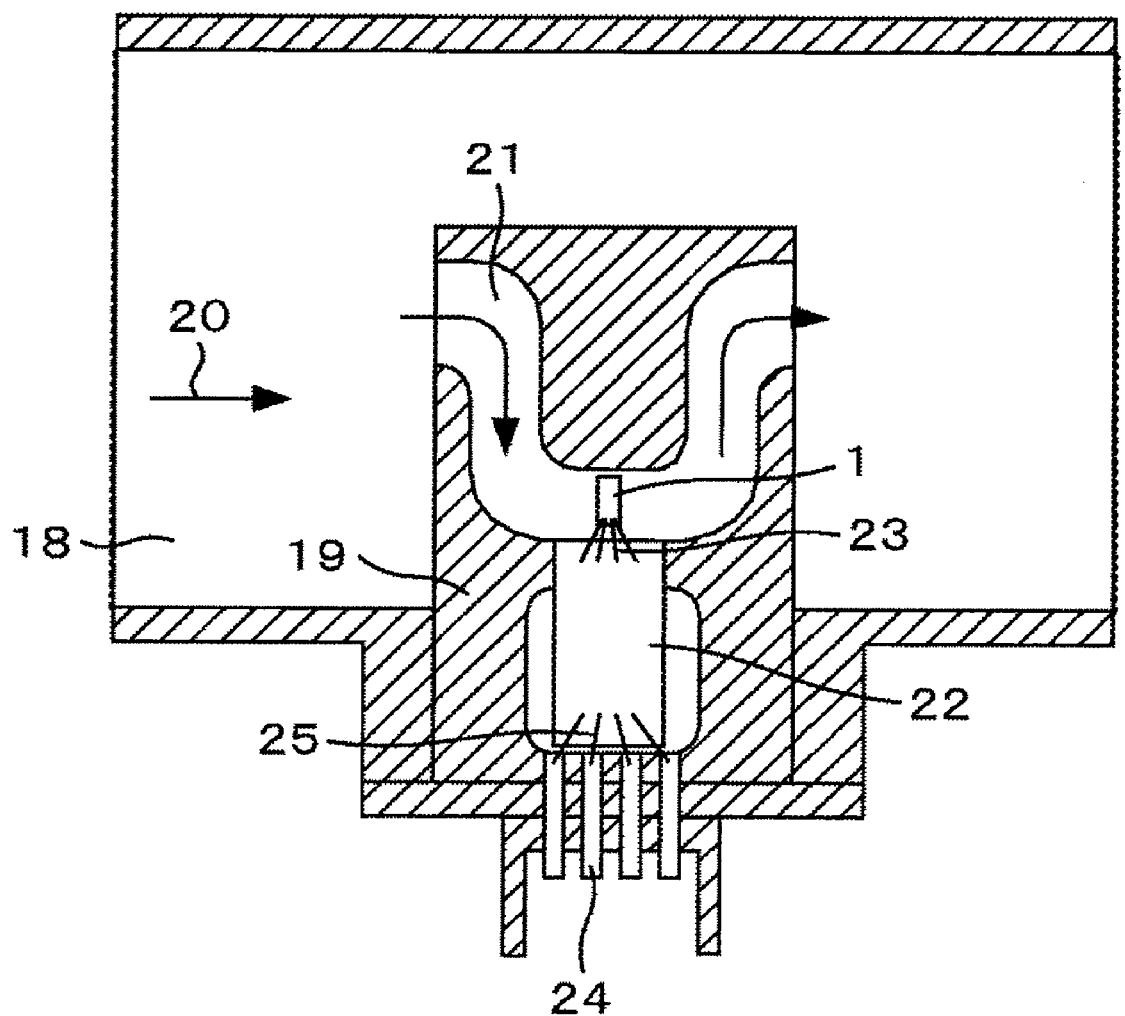
FIG. 4 is a diagram illustrating the installation structure of the sensor element 1 of the thermal-type flow-rate sensor.

Subsequently, an embodiment in which the sensor element 1 and the driving-and-detecting circuit is installed in the intake pipe of the internal combustion engine of a vehicle or the like will be described by referring to FIG. 4. FIG. 4 shows that a base member 19 is provided to protrude from a wall of an intake pipe 18. A secondary passage 21 is formed in the base member 19 in such a manner that part of intake-air 20 flowing through the intake pipe 18 is introduced into the secondary passage 21. A rectangular-shaped recessed portion is formed in the secondary passage 21, and the sensor element 1 is installed in the recessed portion. In the secondary passage 21, a flow passage corresponding to the installation site for the sensor element 1 has a straight shape whereas flow passages upstream of the installation-site portion and the portion downstream thereof have curved shapes. A circuit board 22 with the driving-and-detecting circuit of the sensor element 1 mounted thereon is provided on the base member 19. Gold bonding wires 23 are provided to electrically connect the sensor element 1 to the circuit board 22. In addition, terminals 24 are provided to supply electric power to the driving circuit and to extract the output signals from the driving circuit, so that the circuit board 22 and the terminals 24 are electrically connected via aluminum bonding wires 25.

Figure 5:
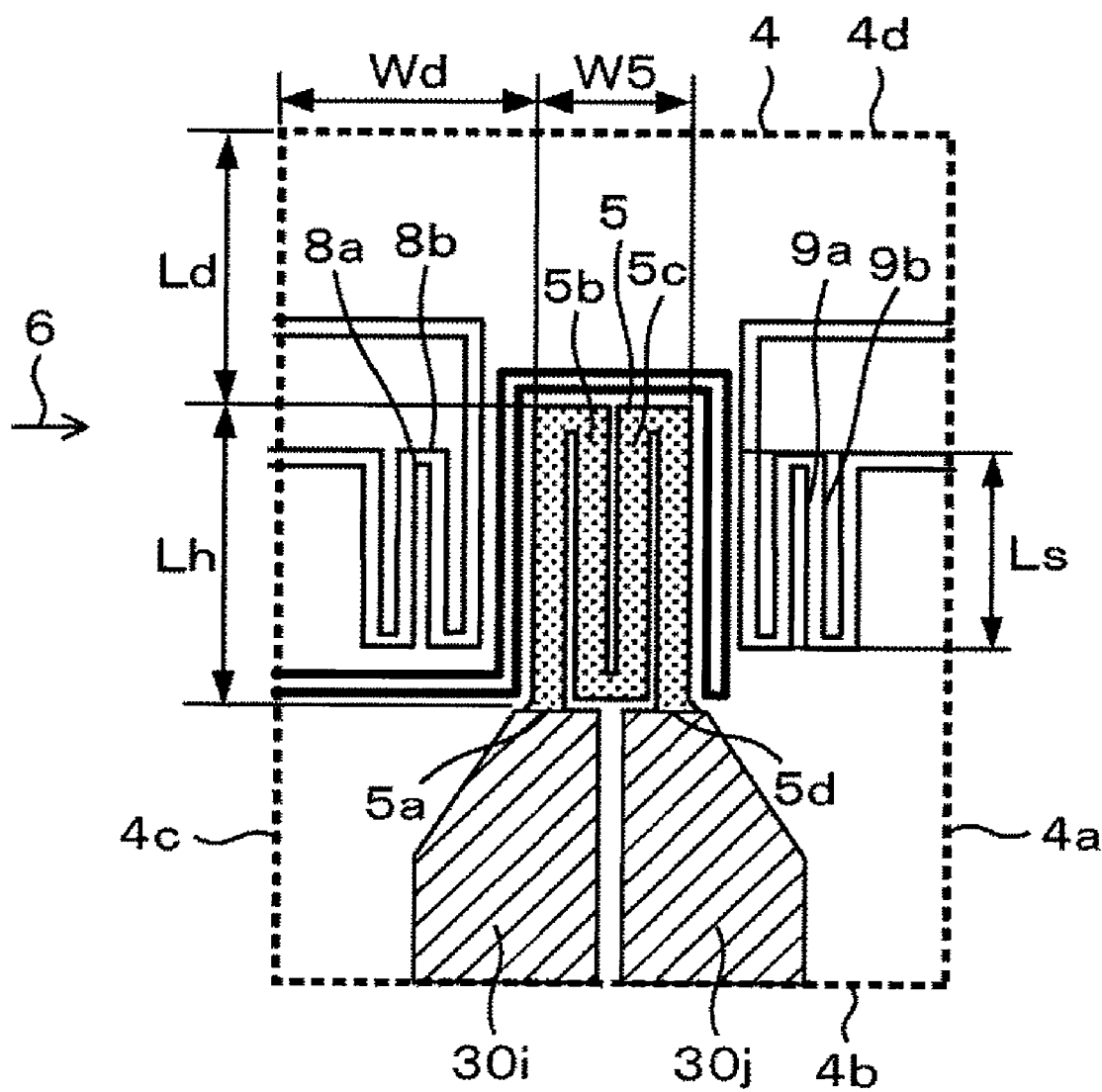
FIG. 5 is an enlarged view of a portion including a diaphragm 4 of the sensor element 1 shown in FIG. 1.

FIG. 5 is an enlarged view illustrating the diaphragm 4 of the sensor element 1 together with the vicinities of the diaphragm 4.

In FIG. 5, the length of the heating resistor 5 in a direction perpendicular to the flowing direction of the air flow 6, which is the measurement-target fluid, is denoted by Lh. In addition, the shortest distance from the upstream-side edge of the heating resistor 5, in the flowing direction of the air flow 6, to the upstream-side edge (a side 4c) of the diaphragm 4 is denoted by Wd. In addition, the shortest distance from an edge of the heating resistor 5 located in a direction that is perpendicular to the flowing direction of the air flow 6 to an edge of the diaphragm 4 (either a side 4b or a side 4d) is denoted by Ld. In the configuration of this first embodiment, the length Lh, and the distances Wd and Ld have the following relations: Wd≧0.5×Lh, and Ld≧0.5×Lh. To put it differently, the shortest distance Xd from the perimeter of the heating resistor 5 to the perimeter of the diaphragm 4 satisfies at least Xd≧0.5×Lh. To this end, the length Lh of the heating resistor 5 is made shorter whereas the width and the length of the diaphragm 4 are made larger.

Note that the zone of the heating resistor 5 is a portion that generates heat principally within the diaphragm 4. So, the heating resistor 5 does not include any such wide portions as wiring portions 30i and 30j shown in FIG. 5. In addition, the heating resistor 5 does not include any resistor through which only a significantly small current flows even if the resistor is electrically connected to the heating resistor 5. Or, like the heating resistor 5 shown in FIG. 5, the heating resistor 5 is a zone which is the principal heat generator and which has an either a U-shape or an M-shape with one or plural folding-back portions.

In this first embodiment, the diaphragm 4 is formed to have a quadrilateral shape with the four sides 4a, 4b, 4c, and 4d. To put it differently, the sides 4a, 4b, 4c, and 4d together form the perimeter edges of the diaphragm 4. To be more specific, the diaphragm 4 has a rectangle shape with each of the sides 4a and 4c being longer than each of the sides 4b and 4d. The diaphragm 4 is formed so that each of the longer sides 4a and 4c crosses the direction of the air flow 6 and each of the shorter sides 4b and 4d extends along the direction of the air flow 6. In an ideal configuration, each of the sides 4a and 4c is perpendicular to the air flow 6 whereas each of the sides 4b and 4d is parallel with the air flow 6.

The heating resistor 5 is formed in such a manner as to extend along the longer sides 4a and 4c and to be folded back at the end portions in the extending direction (i.e., in the perpendicular direction to the air flow 6). Thereby, the heating resistor 5 has plural resistor sections 5a to 5d that are arranged in parallel with each other on the electric insulating film 3a. In addition, the length Lh of the heating resistor 5 in the extending direction of the resistor sections 5a to 5d is made larger than the total width W5 of the plural resistor sections 5a to 5d that are arranged in parallel with each other.

In this way, the shape of the heating resistor 5 can be made adequate for its function without unnecessarily expanding the size of the diaphragm 4. A smaller size of the diaphragm 4 can prevent the strength of the diaphragm 4 from being lowered.

Description will be given below with regard to an effect of making buoyant particles such as carbon particles less likely to adhere to the sensor element 1 of the thermal-type flowmeter when the above-described configuration is adopted.

Figure 6A:
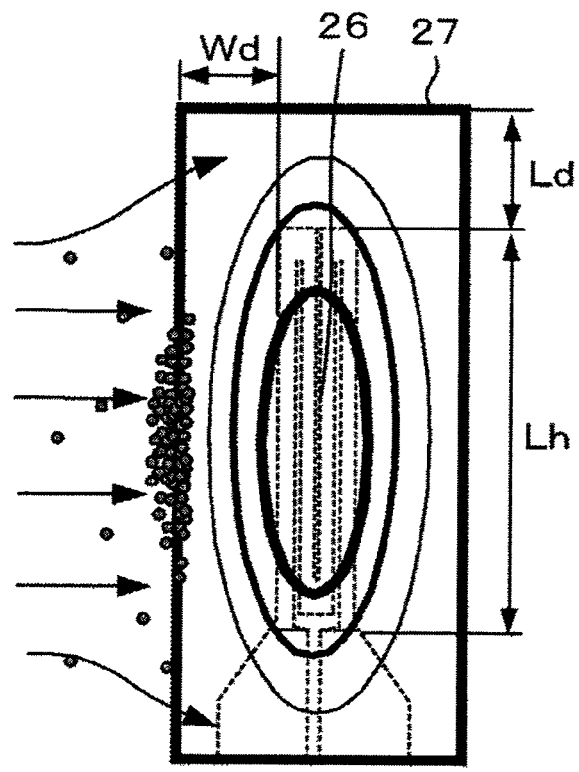
FIGS. 6A and 6B are diagrams illustrating temperature distributions of diaphragms of various settings.
Figure 6B:
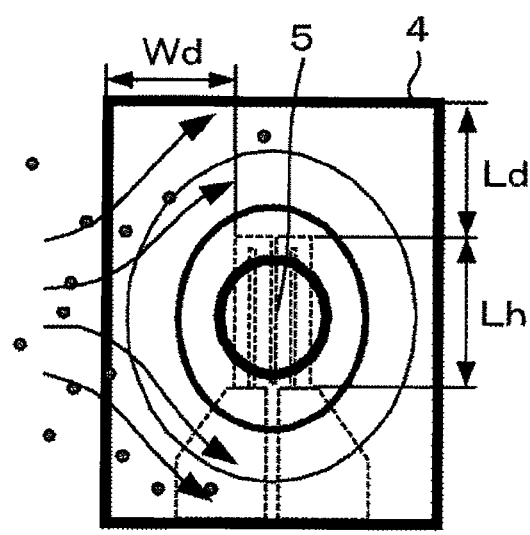

FIG. 6 illustrates isothermal lines to show the shape of the temperature distribution on a diaphragm when the heating of a heating resistor is controlled. FIG. 6A is a case of a conventional configuration whereas FIG. 6B is of the configuration of this first embodiment.

The temperature distribution on a diaphragm 27 of the conventional configuration shown in FIG. 6A shows a concentric temperature distribution having the peak temperature at the center of a heating resistor 26. In addition, each of the isothermal lines in FIG. 6A has an ellipsoidal shape with the major axis extending in the longitudinal direction of the heating resistor 26. If buoyant particles such as carbon particles are brought to a sensor element with the above-described shape by the air flow, the heat generated by the heating resistor 26 activates the thermal motions of the air surrounding the heating resistor 26, so that a thermal barrier is formed. The thermal barrier causes the fine particles to adhere to an edge of diaphragm 27 located upstream of the heating resistor 26. Raising the heating temperature of the heating resistor 26 furthermore enhances the thermophoresis effect and accelerates the adhering of the fine particles.

The temperature distribution on a diaphragm 4 of the configuration of this first embodiment shown in FIG. 6B has also a concentric-circle shape with the center of the heating resistor 5 having the peak temperature. Each of the isothermal lines in FIG. 6B, however, has a shape with higher circularity. When being brought to the sensor element 1 with the above-described shape by the air flow 6, the buoyant particles such as carbon particles hit the thermal barrier formed by the heat generated by the heating resistor 5, and then flow in such a manner as to evade the heating resistor 5, that is, as to go around each of the edges of the heating resistor 5 located in the perpendicular direction to the direction of the air flow 6. This is because in this first embodiment, the curvature of each of the isothermal lines on the upstream side of the diaphragm 4 is larger than the corresponding curvature in the conventional case. Also in the conventional case, some of the buoyant particles can evade the thermal barrier by going around the edges of the heating resistor 26 located in the perpendicular direction to the direction of the air flow. Most of the buoyant particles, however, are blocked by the thermal barrier formed by the heating resistor 26. Thus, the blocked buoyant particles are held in the vicinity of the upstream-side edge of the diaphragm 27, and eventually adhere to the upstream-side edge.

In addition, with the configuration Ld≧0.5×Lh, the buoyant particles flow past the heating resistor 5 passing on a route that is farther away from the heating resistor 5. Accordingly, the adhering of the buoyant particles to the vicinity of the heating resistor 5 can be reduced.

Description will be given below with regard to results of an experiment in which the thermal-type flowmeter was placed in a flow of an exhaust gas of a diesel engine and how badly the sensor element is contaminated by the carbon and the oil contained in the exhaust gas was investigated. Note that the adhering of the buoyant particles to the upstream-side edge of the diaphragm by the thermophoresis phenomenon occurs when the measurement-target fluid flows at a relatively low speed. For this reason, the diesel engine used in the experiment was kept in an idling state. The measurement-target fluid flowed at a speed of 1.5 m/sec approximately. The thermal-type flowmeter was left exposed to the exhaust gas for an hour. During the experiment, the sensor element was contaminated to a similar extent to what would be achieved by the sensor element of the thermal-type flowmeter installed in the intake-air pipe of a vehicle after the vehicle had run several tens of thousands of kilometers.

Figure 7A:
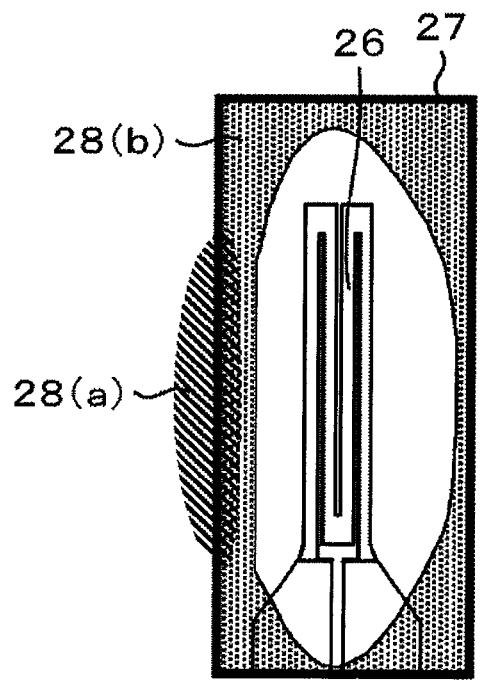
FIGS. 7A to 7C are diagrams illustrating the distributions of buoyant particles adhered to the diaphragms.
Figure 7B:
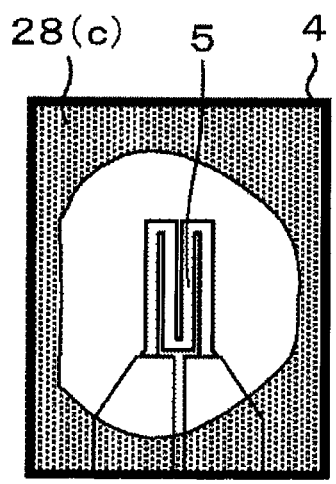
Figure 7C:
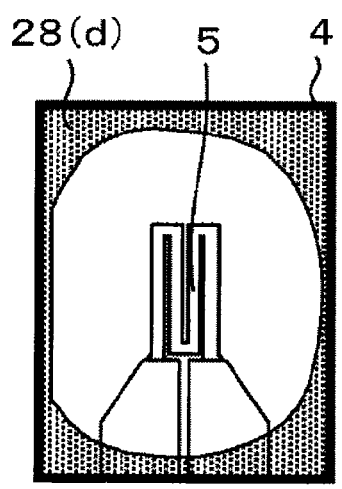

FIGS. 7A to 7C are diagrams each of which schematically illustrates a distribution pattern of the buoyant particles that adhered to the diaphragm during the experiment. FIG. 7A shows an adhering pattern of the buoyant particles in a case where the conventional diaphragm 27 was adopted and the temperature of the heating resistor 26 was raised by 100 degrees (i.e., $\Delta Th=100°$ C.). The buoyant particles adhered most thickly to the edge of the diaphragm 27 located at the upstream side of the heating resistor 26 (as indicated by a portion 28(*a*) in FIG. 7A). In addition, the buoyant particles thinly adhered to the edge portions all around the diaphragm 27 (as indicated by a portion 28(*b*) in FIG. 7A). The adhering of the buoyant particles to the portion 28(*a*) was predominantly caused by the thermophoresis effect, which was caused by the heating of the heating resistor 26. The adhering of the buoyant particles to the portion 28(*b*) was predominantly caused by the diffusion of the buoyant particles around the diaphragm 27.

FIG. 7B shows an adhering pattern of the buoyant particles in a case where the diaphragm 4 of this first embodiment was adopted and the temperature of the heating resistor 5 was raised by 100 degrees (i.e., $\Delta Th=100°$ C.). In this first embodiment, the buoyant particles thinly adhered to a portion 28(*c*) located along the edges of the diaphragm 4, and the adhering of the buoyant particles was predominantly caused by the diffusion of the buoyant particles. Thus, the first embodiment achieves reduction in amount of the buoyant particles adhering, due to the thermophoresis effect, to the edge of the diaphragm 4 located at the upstream side of the heating resistor 5, although such adhering due to the thermophoresis effect was noticeable in the conventional configuration.

FIG. 7C shows an adhering pattern of the buoyant particles in the case where the diaphragm 4 of this first embodiment was adopted and the temperature of the heating resistor 5 was raised by 300 degrees (i.e., $\Delta Th=300°$ C.). With the configuration of this first embodiment of the invention, even a larger value of $\Delta Th$ did not accelerate the adhering of the buoyant particles caused by the thermophoresis effect. In addition, a larger value of $\Delta Th$ activated the thermal motions of the air flowing past the diaphragm 4, so that the diffusion of the buoyant particles from the periphery of the diaphragm 4 towards the heating resistor 5 was reduced. Thus obtained was an effect of reducing the zone of adhered particles in the peripheral portion of the diaphragm 4 in a direction to the periphery of the diaphragm 4. Incidentally, the exhaust gas of a diesel engine or the like contains oil, and adhesion of the oil further causes adhesion of fine particles such as carbon particles. Since the temperature of the heating resistor 5, however, was raised by a larger value of $\Delta Th$, and the oil was heated up to a temperature of 200° C. or higher, the oil was evaporated. Consequently, the adhering of the buoyant particles was reduced further.

In addition, with the configuration of this first embodiment, the diffusion of the buoyant particles is the predominant cause for the adhesion. Suppose a case where larger distances are secured from the edges of the heating resistor 5 to the corresponding edges of the diaphragm 4 (i.e., with larger values of Ld and Wd). In this case, larger distances can be secured from the heating resistor 5 to the zones which are located in the periphery of the diaphragm 4 and in which the adhering of the buoyant particles is caused by the diffusion. In addition, measurement errors of the thermal-type flow-rate sensor which occur due to the adhering of the buoyant particles can be reduced.

Figure 8:
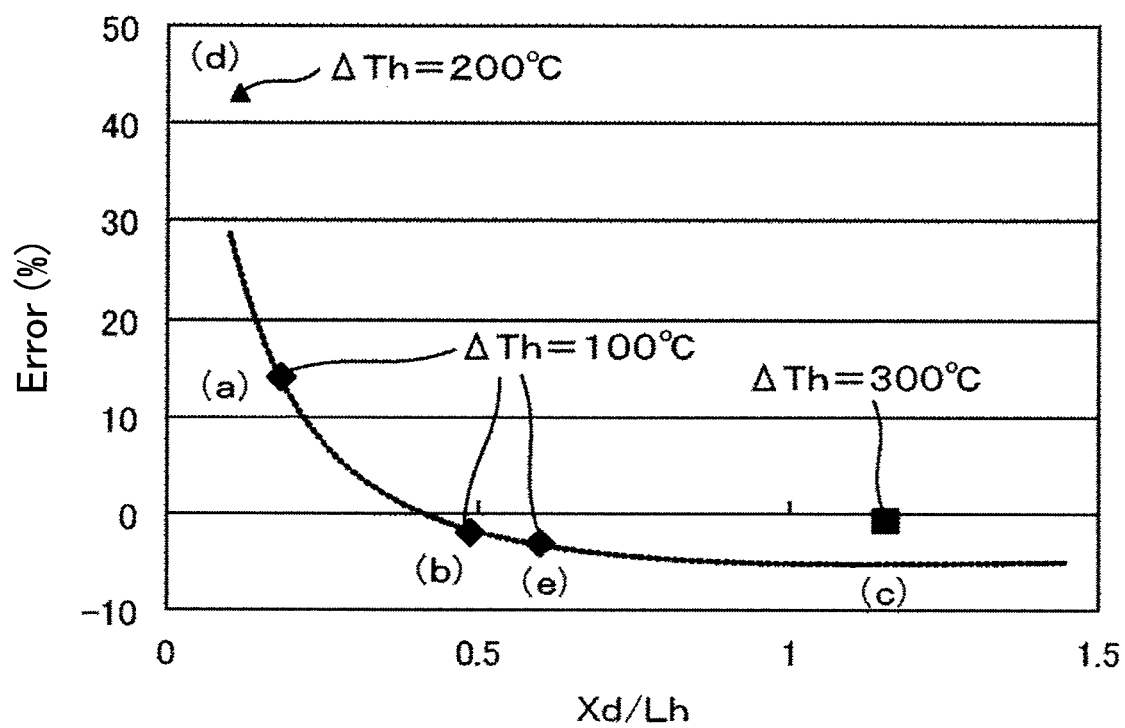
FIG. 8 is a chart illustrating an experiment result concerning measurement errors of thermal-type flow-rate sensors caused by such causes as the adherence of buoyant particles.

FIG. 8 shows a comparison of the measurement errors caused by the contamination between the thermal-type flowmeters used in the above-described experiment. If the adhering of the buoyant particles changes the temperature distributions of the diaphragms 4 and 27, such changes have an influence on the measurement errors of the thermal-type flowmeters, particularly measurement errors occurring in an area with a smaller amount of fluid flow. This is because in an area with a smaller amount of fluid flow, the flow of the fluid (air) creates only a smaller difference between the temperature detected by the upstream-side temperature sensors 8*a* and 8*b* and the temperature detected by the downstream-side temperature sensors 9*a* and 9*b*. Accordingly, an experiment was conducted with the speed of the air flow set at 1.5 m/s, approximately. FIG. 8 shows the errors in the flow-rate measurement obtained as the results of the experiment. The measurement points (a), (b), and (c) shown in FIG. 8 correspond respectively to the experiment results of the cases shown in FIGS. 7A, 7B, and 7C, where differently-shaped diaphragms of the sensor element were adopted and the temperatures of the heating resistors were raised by different degrees. The horizontal axis of the graph represents the value of Xd/Lh for the diaphragms 4 and 27. Note that the value of Xd is the shortest distance in each diaphragm shape from the heating resistor to the edges of the diaphragm.

In FIG. 8, errors of +15% are recorded as the measurement errors at the measurement point (a) of the case where the conventional configuration was adopted. This is because the thermophoresis effect made the buoyant particles contaminate the upstream-side edge of the diaphragm 27 to a larger extent for the same air flow. The contamination of the larger extent lowered the temperatures detected by the upstream-side temperature sensors 8*a* and 8*b* that were provided upstream of the heating resistor 26. In contrast, errors of a negative small amount are recorded in FIG. 8 as the measurement errors at the measurement point (b) of the case where the configuration of this first embodiment was adopted. The magnitude of the errors for the first embodiment is significantly small in comparison with the corresponding magnitude for the conventional case.

Concerning the relation between the measurement errors caused by the contamination and the value of Xd/Lh, a sharp increase in the measurement errors is observed when the value of Xd/Lh becomes 0.4 or even smaller. Accordingly, for keeping the measurement errors caused by the contamination within a range of ±5%, the value of Xd/Lh has to be set at 0.4 or larger.

In addition, when Xd/Lh≦0.5, the measurement errors become positive. In contrast, when Xd/Lh≧0.5 approximately, the measurement errors become negative. This means that in the range of positive measurement errors, the adhering of the buoyant particles to the upstream-side edge of the diaphragm is larger for the same air flow. To put it differently, the thermophoresis effect is the predominant cause of the contamination. Meanwhile, in the range of negative measurement errors, the buoyant particles that are diffused and go around the heating resistor adhere more to the downstream side of the diaphragm than to the upstream side thereof. Nevertheless, the diffusion and the like make the fine particles adhere to the downstream side of the diaphragm thinly in comparison to the thickly adhering of fine particles caused by the thermophoresis effect. So, the thin adhesion of the fine particles has a smaller influence on the measurement errors.

In addition, when Xd/Lh≈0.5, approximately the same amount of fine particles adhere to the portions of the diaphragm 4 located at the upstream side and the downstream side of the heating resistor 5. In this case, the temperature changes caused on the diaphragm 4 by the adhesion of the fine particles become symmetric between the upstream side of the heating resistor 5 and the downstream side thereof. The difference between the temperature detected by the upstream-side temperature sensors 8a and 8b and the temperature detected by the downstream-side temperature sensors 9a and 9b does not change. Accordingly, measurement errors caused by the adhesion of the buoyant particles become smaller. For this reason, the configuration of this first embodiment has a larger effect if applied to a thermal-type flow-rate sensor that is configured in the following way. At least a pair of temperature-measuring resistors are formed, one of the pair of temperature-measuring resistors formed at the upstream side of the heating resistor and the other one formed at the downstream side thereof. The difference between the temperature at the upstream side of the heating resistor and the temperature at the downstream side thereof is detected using the pair of temperature-measuring resistors. The flow rate of the measurement-target fluid is measured using the temperature difference obtained by the pair of temperature-measuring resistors.

The measurement point (c) in FIG. 8 represents the measurement errors of the case where the configuration of this first embodiment was adopted and the temperature of the heating resistor 5 was raised by 300 degrees (i.e., ΔTh=300° C.). The measurement point (d) represents measurement errors of a case where the conventional configuration was adopted and the temperature of the heating resistor was raised by 200 degrees (i.e., ΔTh=200° C.). As the measurement point (d) shows, if the conventional configuration is adopted and the temperature of the heating resistor is raised by larger degrees (i.e., with a larger value of ΔTh), the adhering of the buoyant particles caused by the thermophoresis effect is increased further, resulting in larger measurement errors. In contrast, as the measurement point (c) shows, if the configuration of this first embodiment is adopted and the temperature of the heating resistor is raised by larger degrees (i.e., with a larger value of ΔTh), the measurement errors become smaller. In summary, when Xd/Lh≦0.5, a larger value of ΔTh increases the influence of the thermophoresis effect. In contrast, when Xd/Lh≧0.5, the thermophoresis effect has little influence even with a larger value of ΔTh.

From the foregoing description, the following conclusion can be obtained. Assume that Xd represents the shortest distance from the perimeter of the heating resistor 5 to the perimeter of the diaphragm 4, and Lh represents the length of the heating resistor 5 in the direction perpendicular to the direction of the air flow 6. When Xd/Lh≧0.5 as in the configuration of this first embodiment, the adhering of the buoyant particles caused by the thermophoresis phenomenon can be reduced. In this case, the sensitivity in the flow-rate measurement can be enhanced by increasing the heating temperature of the heating resistor 5. In addition, it is more preferable to set the value of Xd/Lh at 0.6 or larger by taking into consideration variation in manufacturing of the sensor elements and fluctuations such as turbulence of air flow or the like.

There is an even more preferable configuration. Assume that in FIG. 5, the Ls represents the maximum length, in the direction perpendicular to the flowing direction of the measurement-target fluid, of each of the upstream-side temperature sensors 8a and 8b and the downstream-side temperature sensors 9a and 9b, and is shorter than the length Lh of the heating resistor 5. In this case, all of the upstream-side temperature sensors 8a and 8b and the downstream-side temperature sensors 9a and 9b can be placed far away from the fine particles that adhere to the vicinities of the edges of the diaphragm 4 located in the direction perpendicular to the direction of the air flow 6. Accordingly, the influence of the adhered buoyant particles can be reduced further. Meanwhile, the center of the heating resistor 5 has the peak temperature in the temperature distribution on the diaphragm 4. Accordingly, the sensitivity in flow-rate measurement can be enhanced by shortening the length of each of the upstream-side temperature sensors 8a and 8b and the downstream-side temperature sensors 9a and 9b and by concentrating these temperature sensors 8a, 8b, 9a, and 9b on the central portion of the heating resistor 5. In addition, this configuration can reduce deterioration of the measurement accuracy, which might otherwise deteriorate by factors such as a change of an adhering portion of buoyant particles such as carbon particles because of an occurrence of such a drifting flow that the measurement-target fluid flows in an oblique direction.

The diaphragm 4 has a rectangular shape with the sides extending in the longitudinal direction of the heating resistor 5, that is, the sides extending in the direction perpendicular to the direction of the air flow 6. Accordingly, the shape of the heating resistor 5 can be made adequate for its function without unnecessarily expanding the size of the diaphragm 4. It is found that when the value of Xd/Lh is set at 0.4 or larger, preferably at 0.5 or larger, or more preferably at 0.6 or larger, the influence of the adhering of the buoyant particles can be reduced. Accordingly, by determining the value of Xd as small as possible in a range in which one of the relations is at least satisfied, the strength of the diaphragm 4 can be prevented from being lowered.

In addition, note that the size of the substrate 2 is limited to a certain range and expanding the diaphragm 4 causes a problem of strength. Accordingly, the upper limit value of Xd/Lh cannot be infinite but should be within a certain finite range. To put it differently, the upper limit value of Xd/Lh is a design matter, and is determined by taking the size and the necessary strength of the substrate 2 into consideration. So, a value appropriate for each sensor element can be employed.

[Second Embodiment]

Figure 9:
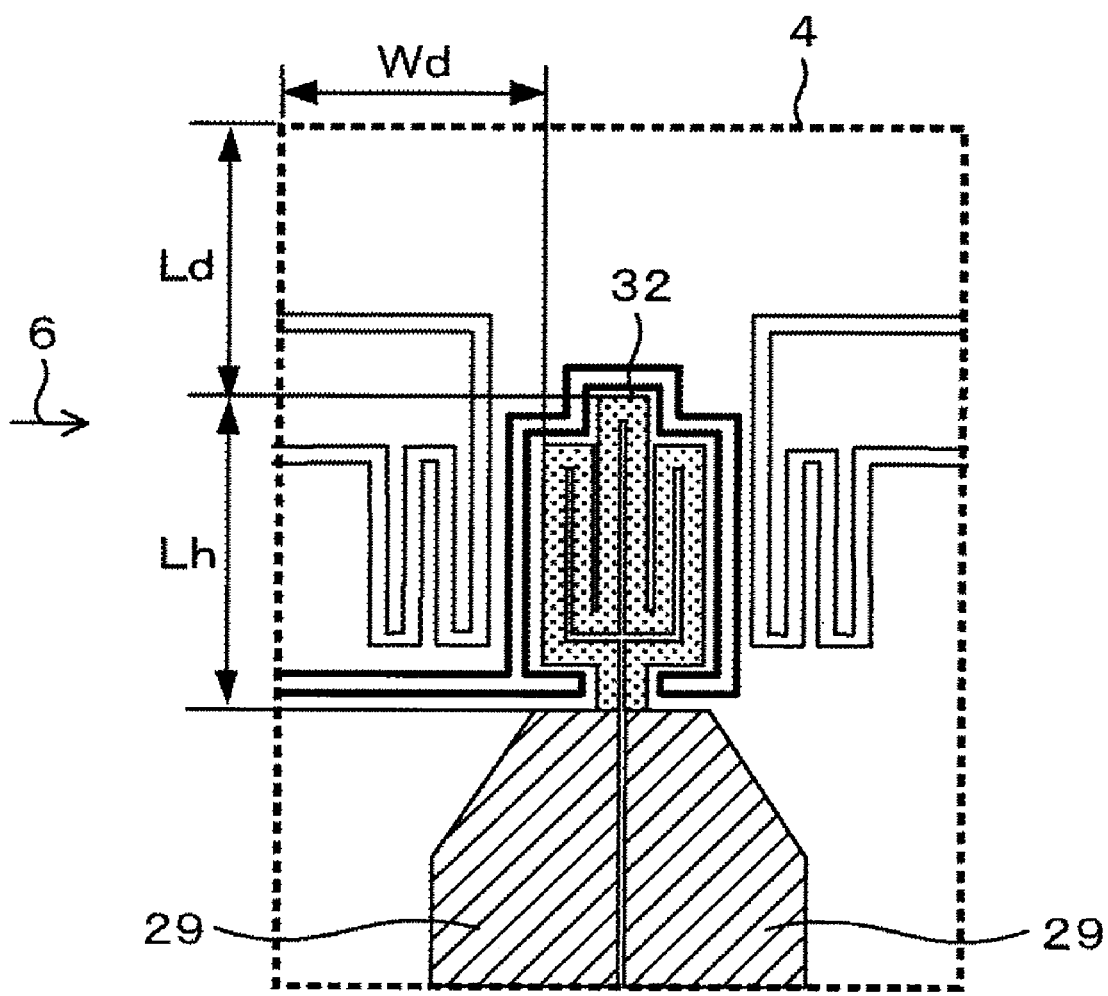
FIG. 9 is an enlarged view of a diaphragm 4 of a sensor element of a thermal-type flow-rate sensor according to a second embodiment of the invention.

FIG. 9 is an enlarged view illustrating a diaphragm 4 of a thermal-type flow-rate sensor element 1 according to a second embodiment of the invention. The diaphragm 4 of this second embodiment shown in FIG. 9 differs from the diaphragm 4 of the first embodiment shown in FIG. 5 in that the diaphragm 4 of this second embodiment includes a heating resistor 32 having a central portion that protrudes in the direction of the air flow 6. Accordingly, the heating resistor 32 is substantially cross-shaped or substantially circle-shaped. Consequently, the temperature distribution on the diaphragm 4 can be more circle-shaped temperature distribution with the center of the heating resistor 32 being the peak. The circle-shaped temperature distribution can prevent the adhering of the buoyant particles such as carbon particles.

[Third Embodiment]

Figure 10:
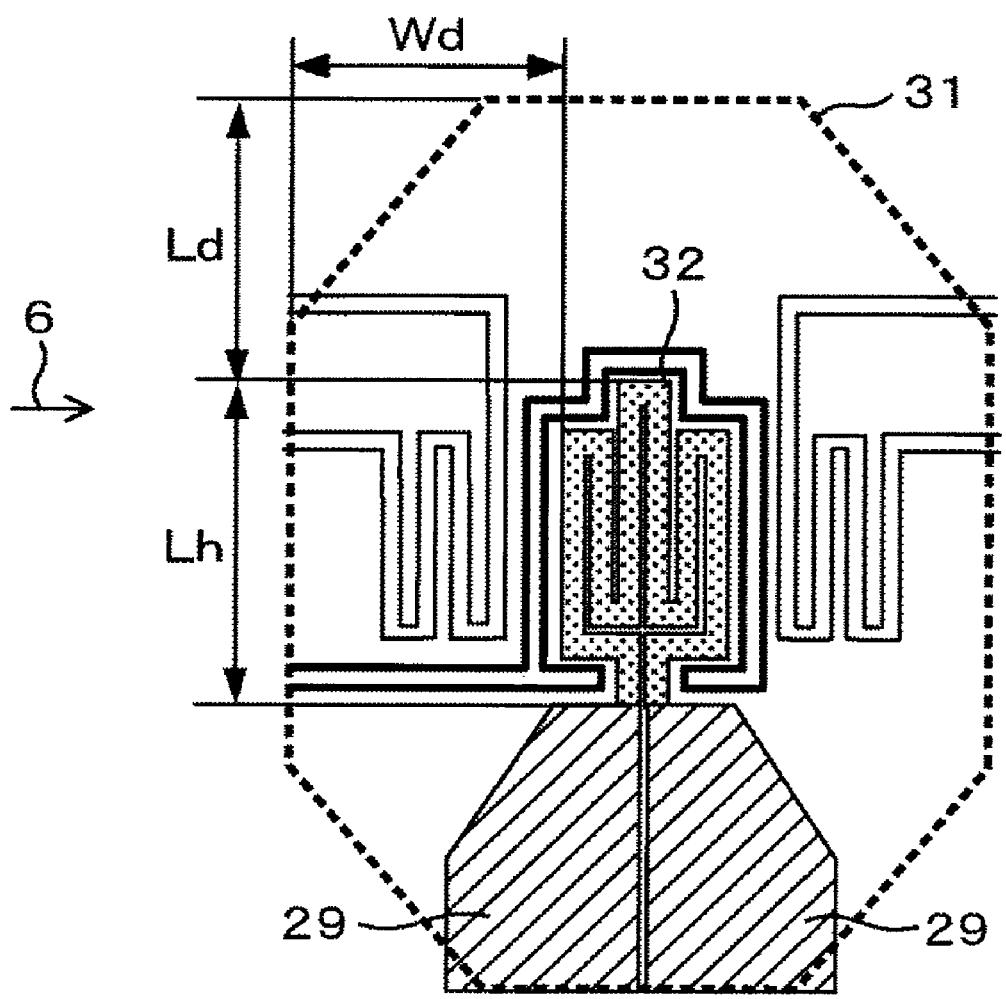
FIG. 10 is an enlarged view of a diaphragm 31 of a sensor element of a thermal-type flow-rate sensor according to a third embodiment of the invention.

FIG. 10 is an enlarged view illustrating a diaphragm 31 of a thermal-type flow-rate sensor element 1 according to a third embodiment of the invention. The diaphragm 31 of this third embodiment shown in FIG. 10 differs from the diaphragm 4 of the first embodiment shown in FIG. 5 in that each of the upstream-side edge and the downstream-side edge of the diaphragm 31 of this third embodiment has a central portion that protrudes in the direction of the air flow 6. Accordingly, the diaphragm 31 is substantially circle-shaped. Consequently, the temperature distribution on the diaphragm 31 can be more circle-shaped temperature distribution with the center of the heating resistor 32 being the peak. The circle-shaped temperature distribution can prevent the adhering of the buoyant particles such as carbon particles.

Subsequently, description will be given below with regard to a method of manufacturing the sensor element 1 of the first to the third embodiments.

A semiconductor substrate made of monocrystalline silicon (Si) or the like is used as the substrate 2. A film made of silicon dioxide ($SiO_2$) and silicon nitride ($Si_3N_4$) is formed by the thermal oxidation method or the CVD method on a surface of the monocrystalline silicon (Si) substrate 2 to be used as a base. The film has a predetermined thickness of 1 μm approximately, and will serve as the electric insulating film 3a. Then, as the resistor, a layer of polycrystalline silicone (Si) semiconductor thin film having a thickness of 1 μm approximately is formed by the CVD method or the like.

Then, impurities are diffused into the Polycrystalline silicone (Si) semiconductor thin film. High-concentration doping operation is performed so as to obtain predetermined resistance. In addition, a resist is formed into a predetermined shape by a publicly-known photolithography method, and then the polycrystalline silicon (Si) semiconductor thin film is patterned by, for example, the reactive ion etching method. Thus obtained are the predetermined resistors 5, 7, 8a, 8b, 9a, 9b, 10, 11, and 12 and the wiring portions 30a to 30n.

In the subsequent process, the electric insulating film 3b to be used as the protection film is formed. To this end, a film of silicon dioxide ($SiO_2$) and silicon nitride ($Si_3N_4$) is formed to have a thickness of approximately 1 μm by the CVD method or the like as in the case of the electric insulating film 3a.

Subsequently, terminal electrodes made of aluminum, gold, or the like to serve as terminals for connection to the external circuits are formed in the electrode pad portion 13 after the protection film 3b are partially removed. In addition, the wiring portions 30a to 30n for connecting the resistors to their corresponding terminals may have a multilayer film structure including the polysilicon (Si) semiconductor thin film, aluminum, gold, and the like.

In the final process, an etching-mask material is formed on the back-side surface of the monocrystalline silicon (Si) semiconductor substrate 2, and then is patterned into a predetermined shape. Anisotropic etching is performed using an etchant such as potassium hydroxide (KOH) solution. Accordingly, the hollow portion 29 is formed, and the diaphragm 4 is thus formed.

Through the above-described processes, the formation of the sensor element 1 is completed.

The description of the above-described embodiments is based on a case where a polysilicon (Si) semiconductor thin film is used as the resistors. It is, however, possible to obtain similar effects if the resistors are made of such metals as platinum.

In addition, in the above-described embodiments, the substantially M-shaped heating resistor 5 is formed in the diaphragm 4. It is, however, possible to obtain similar effects if the heating resistor 5 is substantially U-shaped or meander-shaped.

In addition, in the above-described embodiments, description has given with regard to the two pairs, in total, of temperature-measuring resistors 8a and 8b as well as 9a and 9b provided both upstream of and downstream of the heating resistor 5. It is, however, possible to obtain similar effects by employing a configuration in which only one pair of temperature-measuring resistors are provided.

In addition, the above-described embodiments employ a method in which the heating temperature of the heating resistor 5 is controlled by detecting the temperature of the heating resistor 5 on the basis of the changes in the resistance of the heating-temperature sensor 7 provided around the heating resistor 5. It is, however, possible to obtain similar effects by employing a method in which the heating temperature of the heating resistor 5 is controlled by detecting the temperature of the heating resistor 5 directly from the changes in the resistance of the heating resistor 5.

In addition, in the above-described embodiments, description has been given with regard to a temperature difference method in which the flow rate and the direction of the fluid flow are measured based on the temperature difference detected by the temperature sensors situated both upstream of and downstream of the heating resistor 5. It is, however, possible to obtain similar effects by employing a measurement method in which the flow rate and the direction of the fluid flow are measured based on the current for heating the heating resistor 5 or on the changes in resistance of the heating resistor 5.

The above-described embodiments can be summarized as follows.

In order to achieve the foregoing object, the thermal-type flowmeter according to the present invention is configured as follows. The thermal-type flowmeter includes: a passage 21 into which a measurement-target fluid is introduced; and a sensor element 1 which is provided in the passage 21 and which measures a flow rate of the measurement-target fluid, the sensor element 1 including a semiconductor substrate 2; a hollow portion 29 formed in the semiconductor substrate 2, and a heating resistor 5 formed on an electric insulating film 3a above the hollow portion 29, the sensor element 1 measuring the flow rate of the measurement-target fluid by radiating heat from the heating resistor 5 to the measurement-target fluid. When Lh is the length of the heating resistor 5 in a direction perpendicular to a flowing direction 6 of the measurement-target fluid and Wd is the shortest distance between an upstream-side edge of the heating resistor 5 and a peripheral edge 29a (outer peripheral edge 4a of a diaphragm) of the hollow portion 29 in the flowing direction 6 of the measurement-target fluid, $Wd \geq 0.4 \times Lh$ is satisfied in a relation between Lh and Wd. With this configuration, by raising the heating temperature of the heating resistor 5, the adhering of the buoyant particles can be reduced. Preferably, $Wd \geq 0.5 \times Lh$ is satisfied in the relation between Lh and Wd.

In addition, when Ld is the shortest distance between an edge of the heating resistor 5 and the peripheral edge 29a (4a) of the hollow portion 29 in the direction perpendicular to the flowing direction 6 of the measurement-target fluid, $Ld \geq 0.4 \times$ Lh is satisfied in a relation between Lh and Ld. Preferably, Ld≧0.5×Lh is satisfied in a relation among Lh and Ld. This configuration leads to a configuration in which the adhering of the buoyant particles such as carbon particles is reduced by raising the heating temperature of the heating resistor 5.

According to the conventional technique, if the heating temperature of the heating resistor 5 is raised, the thermophoresis effect is accelerated to increase the adhesion amount. With the above-described configuration, however, the adhering of the buoyant particles can be reduced. Accordingly, by raising the heating temperature of the heating resistor 5, the sensitivity of flow-rate detection by the sensor element 1 can be easily improved. In addition, the heating resistor 5 can be reduced in size, and thus the electric power consumption of the heating resistor 5 can be reduced. Consequently, the sensor element 1 can be driven with smaller electric power.

In addition, Ld≧Wd is satisfied in a relation between Wd and Ld. With this configuration, the adhering of the buoyant particles can be reduced more effectively. The adhering of the buoyant particles to the electric insulating film 3a increases heat conduction from the heating resistor 5 to the semiconductor substrate 2. However, the adhering of the buoyant particles to the electric insulating film 3a can be reduced. Accordingly, heat conduction from the heating resistor 5 to the semiconductor substrate 2 can be reduced. Consequently, the sensor element 1 can be made to consume less electric power.

Furthermore, the thermal-type flowmeter includes temperature-measuring resistors 8a, 8b, 9a, and 9b respectively formed both upstream of and downstream of the heating resistor 5. The length of each of the temperature-measuring resistors 8a, 8b, 9a, and 9b in the direction perpendicular to the flowing direction 6 of the measurement-target fluid is equal to or shorter than the length of the heating resistor 5 in the direction perpendicular to the flowing direction 6 of the measurement-target fluid. With this configuration, in the temperature distribution on the hollow portion 29 (diaphragm 4), the peak temperature is recorded at the center of the heating resistor 5. Accordingly, the flow-rate measuring sensitivity can be improved by shortening the length of the upstream-side temperature-measuring resistor, by shortening the length of the downstream-side temperature-measuring resistor, and by concentrating the temperature-measuring resistors 8a, 8b, 9a, and 9b in the vicinity of the center of the heating resistor 5. In addition, this configuration can reduce deterioration of the measurement accuracy, which might otherwise deteriorate by factors such as a change of a buoyant particles adhering portion because of an occurrence of such a drifting flow that the measurement-target fluid flows in an oblique direction.

The hollow portion 29 is formed into a rectangular shape having shorter sides 4b and 4d formed to extend in the flowing direction 6 of the measurement-target fluid and having longer sides 4a, and 4c perpendicular to the shorter sides 4b and 4d. The heating resistor 5 is provided to extend in a direction along the longer sides 4a, and 4c and is folded back at end portions in the extending direction, thereby including a plurality of resistor sections 5a to 5d arranged in parallel with each other on the electric insulating film 3a. The length of each of the plurality of resistor sections 5a to 5d in the extending direction of the plurality of resistor sections 5a to 5d is set larger than a total width W5 of the plurality of resistor sections 5a to 5d arranged in parallel with each other.

A heating control is performed so that a heating temperature of the heating resistor 5 is at least 200° C. higher than a temperature of the measurement-target fluid. Accordingly, even if oil used in the internal combustion engine of a vehicle or the like is mixed into the intake air, the oil can be evaporated, and thus acceleration of the adhering of the buoyant particles, such adhering of the buoyant particles can be suppressed. In addition, the heating resistor 5 does not always have to be heated up to 200° C. or even higher. It is, however, possible to obtain the same effect with a configuration where the heating resistor 5 is heated up to 200° C. only temporarily in some conditions of the temperature of air and of the time.

Moreover, the thermal-type flowmeter according to an aspect the invention includes: a passage 21 into which a measurement-target fluid is introduced; and a sensor element 1 which is provided in the passage 21 and which measures a flow rate of the measurement-target fluid. The sensor element 1 includes a semiconductor substrate 2, a hollow portion 29 formed in the semiconductor substrate 2, a heating resistor 5 formed on an electric insulating film 3a above the hollow portion 29, and temperature-measuring resistors 8a, 8b, 9a, and 9b provided respectively both upstream of and downstream of the heating resistor 5 in a flowing direction 6 of the measurement-target fluid, and formed on the electric insulating film 3a above the hollow portion 29. The hollow portion 29 is formed into a rectangular shape having shorter sides 4b and 4d formed to extend in the flowing direction 6 of the measurement-target fluid and having longer sides 4a, and 4c perpendicular to the shorter sides 4b and 4d. The heating resistor 5 is provided to extend in a direction along the longer sides 4a, and 4c and is folded back at end portions in the extending direction, thereby including a plurality of resistor sections 5a to 5d arranged in parallel with each other on the electric insulating film 3a, and the heating resistor 5 is formed in such a manner that the length of each of the plurality of resistor sections 5a to 5d in the extending direction of the plurality of resistor sections 5a to 5d is larger than a total width W5 of the plurality of resistor sections 5a to 5d arranged in parallel with each other. Each of the temperature-measuring resistors 8a, 8b, 9a, and 9b is formed to have a length in a direction perpendicular to the flowing direction 6 of the measurement-target fluid that is equal to or shorter than the length of the heating resistor 5 in the direction perpendicular to the flowing direction 6 of the measurement-target fluid. When Lh is the length of the heating resistor 5 in the direction perpendicular to the flowing direction 6 of the measurement-target fluid, Wd is the shortest distance between an upstream-side edge of the heating resistor 5 and the peripheral edge 29a (4a) of the hollow portion 29 in the flowing direction 6 of the measurement-target fluid, and Ld is the shortest distance between an edge of the heating resistor 5 and the peripheral edge 29a (4a) of the hollow portion 29 in the direction perpendicular to the flowing direction 6 of the measurement-target fluid, Wd≧0.4×Lh is satisfied in a relation between Lh and Wd, and Ld≧0.4×Lh is satisfied in a relation between Lh and Ld.

REFERENCE SIGNS LIST 1 sensor element
2 substrate
3a, 3b electric insulating films
4, 31 diaphragms
5, 32 heating resistors
6 air flow
7 heating-temperature sensor
8a, 8b upstream-side temperature sensors
9a, 9b downstream-side temperature sensors
10, 11, 12 thermo-sensitive resistors
13 electrode pad portion 14 temperature distribution
15, 17 amplifiers
16 transistor
18 intake pipe
19 base member
20 intake-air
21 secondary passage
22 circuit board
23 gold bonding wires
24 terminals
25 aluminum bonding wires
26 conventional heating resistor
27 conventional diaphragm
28 portion to which buoyant particles adhere
29 hollow portion
30a to 30n wiring portions

The invention claimed is:

1. A thermal-type flowmeter comprising:
a passage into which a measurement-target fluid is introduced; and
a sensor element which is provided in the passage and which measures a flow rate of the measurement-target fluid, the sensor element including a semiconductor substrate; a hollow portion formed in the semiconductor substrate, and a heating resistor formed on an electric insulating film above the hollow portion, the sensor element measuring the flow rate of the measurement-target fluid by radiating heat from the heating resistor to the measurement-target fluid, wherein
when Lh is a length of the heating resistor in a direction perpendicular to a flowing direction of the measurement-target fluid and Wd is the shortest distance between an upstream-side edge of the heating resistor and a peripheral edge of the hollow portion in the flowing direction of the measurement-target fluid, $Wd \geq 0.4 \times Lh$ is satisfied in a relation between Lh and Wd.

2. The thermal-type flowmeter according to claim 1, wherein $Wd \geq 0.5 \times Lh$ is satisfied in the relation between Lh and Wd.

3. The thermal-type flowmeter according to claim 1, wherein when Ld is the shortest distance between an edge of the heating resistor and the peripheral edge of the hollow portion in the direction perpendicular to the flowing direction of the measurement-target fluid, $Ld \geq 0.4 \times Lh$ is satisfied in a relation between Lh and Ld.

4. The thermal-type flowmeter according to claim 3, wherein $Wd \geq 0.5 \times Lh$ and $Ld \geq 0.5 \times Lh$ are satisfied in a relation among Lh, Wd, and Ld.

5. The thermal-type flowmeter according to claim 1, wherein $Ld \geq Wd$ is satisfied in a relation between Wd and Ld.

6. The thermal-type flowmeter according to claim 1, further comprising temperature-measuring resistors respectively formed both upstream of and downstream of the heating resistor, wherein
a length of each of the temperature-measuring resistors in the direction perpendicular to the flowing direction of the measurement-target fluid is equal to or shorter than the length of the heating resistor in the direction perpendicular to the flowing direction of the measurement-target fluid.

7. The thermal-type flowmeter according to claim 1, wherein
the hollow portion is formed into a rectangular shape having shorter sides formed to extend in the flowing direction of the measurement-target fluid and having longer sides perpendicular to the shorter sides,
the heating resistor is provided to extend in a direction along the longer sides and is folded back at end portions in the extending direction, thereby including a plurality of resistor sections arranged in parallel with each other on the electric insulating film, and
a length of each of the plurality of resistor sections in the extending direction of the plurality of resistor sections is larger than a total width of the plurality of resistor sections arranged in parallel with each other.

8. The thermal-type flowmeter according to claim 1, wherein a heating control is performed so that a heating temperature of the heating resistor is at least 200° C. higher than a temperature of the measurement-target fluid.

9. A thermal-type flowmeter comprising:
a passage into which a measurement-target fluid is introduced; and
a sensor element which is provided in the passage and which measures a flow rate of the measurement-target fluid, wherein
the sensor element includes a semiconductor substrate, a hollow portion formed in the semiconductor substrate, a heating resistor formed on an electric insulating film above the hollow portion, and temperature-measuring resistors provided respectively both upstream of and downstream of the heating resistor in a flowing direction of the measurement-target fluid, and formed on the electric insulating film above the hollow portion,
the hollow portion is formed into a rectangular shape having shorter sides formed to extend in the flowing direction of the measurement-target fluid and having longer sides perpendicular to the shorter sides,
the heating resistor is provided to extend in a direction along the longer sides and is folded back at end portions in the extending direction, thereby including a plurality of resistor sections arranged in parallel with each other on the electric insulating film, and
the heating resistor is formed in such a manner that a length of each of the plurality of resistor sections in the extending direction of the plurality of resistor sections is larger than a total width of the plurality of resistor sections arranged in parallel with each other,
each of the temperature-measuring resistors is formed to have a length in a direction perpendicular to the flowing direction of the measurement-target fluid that is equal to or shorter than a length of the heating resistor in the direction perpendicular to the flowing direction of the measurement-target fluid, and
when Lh is a length of the heating resistor in the direction perpendicular to the flowing direction of the measurement-target fluid, Wd is the shortest distance between an upstream-side edge of the heating resistor and the peripheral edge of the hollow portion in the flowing direction of the measurement-target fluid, and Ld is the shortest distance between an edge of the heating resistor and the peripheral edge of the hollow portion in the direction perpendicular to the flowing direction of the measurement-target fluid, $Wd \geq 0.4 \times Lh$ is satisfied in a relation between Lh and Wd, and $Ld \geq 0.4 \times Lh$ is satisfied in a relation between Lh and Ld.

* * * * *